United States Patent
Nakaya et al.

(10) Patent No.: US 7,020,549 B2
(45) Date of Patent: Mar. 28, 2006

(54) VEHICULAR ELECTRONIC APPARATUS SUPPRESSED OF INTERFERENCE IN RECEIVING A BROADCAST WAVE

(75) Inventors: Hiroaki Nakaya, Miyagi-ken (JP); Takahiro Iwakiri, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 120 days.

(21) Appl. No.: 10/669,022

(22) Filed: Sep. 23, 2003

(65) Prior Publication Data

US 2004/0059484 A1 Mar. 25, 2004

(30) Foreign Application Priority Data

Sep. 24, 2002 (JP) ............... 2002-277358

(51) Int. Cl.
*H04B 1/26* (2006.01)
(52) U.S. Cl. .................. 701/36; 455/296; 455/255; 455/152.1
(58) Field of Classification Search ............ 701/1, 701/36; 340/825.24, 825.25; 455/296, 297, 455/298, 313, 63.1, 67.13, 283, 285, 152.1
See application file for complete search history.

(56) References Cited

U.S. PATENT DOCUMENTS

| 4,403,350 | A |   | 9/1983  | Imai et al. |
|-----------|---|---|---------|---------------------|
| 4,879,758 | A | * | 11/1989 | DeLuca et al. ............. 455/296 |
| 5,420,592 | A | * | 5/1995  | Johnson ................. 342/357.12 |
| 5,519,889 | A | * | 5/1996  | Hipp .......................... 455/297 |
| 5,745,523 | A | * | 4/1998  | Dent et al. .................. 375/216 |

FOREIGN PATENT DOCUMENTS

EP        0 418 149 A2     9/1990

\* cited by examiner

*Primary Examiner*—Richard M. Camby
(74) *Attorney, Agent, or Firm*—Brinks Hofer Gilson & Lione

(57) ABSTRACT

A vehicular electronic apparatus contains a microcomputer, and a crystal oscillator for determining an operating frequency for the microcomputer. An oscillation frequency of the crystal oscillator is selected such that a frequency difference between a frequency of a broadcast wave received by a vehicular receiver and an oscillation frequency of the crystal oscillator or a higher harmonic of the oscillation frequency is 15 kHz or higher or 400 Hz or lower, to suppress an interference in receiving the broadcast wave.

4 Claims, 6 Drawing Sheets

EXAMPLE OF FREQUENCY-TEMPERATURE CHARACTERISTIC OF AT-CUT

FIG. 3A

STANDARD BASIC-WAVE OSCILLATOR CIRCUIT

FIG. 3B

LOAD-CAPACITANCE CHARACTERISTIC OF OSCILLATOR

VEHICULAR ELECTRONIC APPARATUS SUPPRESSED OF INTERFERENCE IN RECEIVING A BROADCAST WAVE

BACKGROUND OF THE INVENTION

1. Field of the Invention

The present invention relates to vehicular electronic apparatuses, and more particularly to a vehicular electronic apparatus in which interference of a received a broadcast wave is suppressed.

2. Description of the Related Art

In the receiver, various noises are to be mixed therein depending upon a state of radio wave propagation, causing problems with reception. Particularly, in an FM receiver mounted on a vehicle, there is an increased possibility of interference by electromagnetic waves caused by different mounted electronic apparatuses with increasing kinds and numbers of electronic apparatuses mounted on the vehicle. In addition, the receiver is also susceptible to the noise caused by fluctuations in the received electric field due to the vehicle traveling, reflection upon buildings, and so on.

With respect to the EMI (Electro Magnetic Interference) caused by the electromagnetic wave generated by the electronic apparatus mounted on a vehicle, countermeasures are taken to suppress interference wave radiation by attaching, on the receiver side, a noise suppressing unit such as a filter or a shield and on the vehicle-mounted electronic apparatus side by selecting a CPU for use in the electronic apparatus, using an appropriate printed-board pattern, or adding countermeasure parts such as a shield, for example.

As described above, the vehicular electronic apparatus generates various interfering waves (unwanted electromagnetic waves). Particularly, recently the number and kind of vehicular electronic apparatuses in which microcomputers are mounted has increased dramatically. This, in turn, increases the noise caused by a crystal oscillator or the like in each apparatus that supplies a clock to the microcomputer, which causes disturbance on the receiving unit of the FM receiver.

In the meanwhile, where a signal is applied to a circuit, such as an amplifier, constituting a receiver, the non-linearity in the amplifier input-output characteristic, if present, causes distortion in its output.

For example, on the vehicular receiver for receiving a broadcast wave of the FM receiver or the like, electromagnetic waves which have frequencies other than that of the desired frequency (such as the foregoing interference waves) are simultaneously received with the electromagnetic wave of the desired frequency. Consequently, a plurality of signals that have different frequencies are simultaneously applied to the amplifier of a circuit close to the antenna.

In this manner, in case two signals different in frequency are applied simultaneously to the amplifier, the amplifier generates a signal having a new frequency component besides the outputs responsive to the respective frequency components of the two applied signals.

The amplifier response characteristic, when two signals are applied to the amplifier, is called the "two-signal characteristic" and is expressed as follows.

Assuming t is time, the amplifier input is represented as x(t) and the output as y(t). If the amplifier has a non-linearity in its input-output characteristic, the output y(t) can be approximated as a polynomial of t, as in Equation (1).

$$y(t)=ax(t)+bx(t)^2+cx(t)^3+\ldots \quad (1)$$

Subsequently, to this amplifier is added by an input signal $\{x1(t), x2(t)\}$ represented by Equation (2). Equation (2) expresses two sinusoidal waves different in frequencies (f1 and f2). The amplifier output at this time can be determined by substituting Equation (2) into Equation (1). This result is given as Equation (3), which is expanded into Equation (4). Incidentally, because the coefficients in the expansion are complex and unnecessary for this illustration, they have been omitted for convenience.

$$x(1)=A \cos(2\pi f1 t)$$
$$x(2)=B \cos(2\pi f2 t) \quad (2)$$

$$y(t) = a\{A\cos(2\pi f1t) + B\cos(2\pi f2t)\} + \quad (3)$$
$$b\{A\cos(2\pi f1t) + B\cos(2\pi f2t)\}^2 +$$
$$c\{A\cos(2\pi f1t) + B\cos(2\pi f2t)\}^3 + \ldots$$

$$y(t) = k0 + k1\cos(2\pi f1t) + k2\cos(2\pi f2t) + k3\cos\{2\pi(2f1)t\} + \quad (4)$$
$$k4\cos\{2\pi(2f2)t\} + k5\cos\{2\pi(f1+f2)t\} + k6\cos\{2\pi(f2-f1)t\} +$$
$$k7\cos\{2\pi(3f1)t\} + k8\cos\{2\pi(3f2)t\} + k9\cos\{2\pi(2f1-f2)t +$$
$$k10\cos\{2\pi(2f2-f1)t\} + k11\cos\{2\pi(2f1+f2)t +$$
$$k12\cos\{2\pi(2f2+f1)t\} + \ldots$$

Subsequently, the terms of Equation (4) are explained.

The first term is a term having only the coefficient. This term is constant and does not change in time. Namely, it signifies that direct current is included in the output.

The second term represents an output of the basic wave produced by the input. If it is assumed that the amplifier is completely linear, only the coefficient of this term is finite while the other coefficients are zero. In other words, the components other than this term are all newly generated components by the amplifier non-linearity.

The third term has respective second harmonic components of the two input signals. The higher harmonic component is also generated a single signal is applied to the amplifier.

The fourth term is a component of a sum of and difference between two input signal frequencies. By utilizing this component, a heterodyne frequency converter circuit can be configured.

The component of the third and fourth term is generated by the secondary coefficient part of Equation (1). Accordingly, to extract or frequency-convert a second harmonic, the circuit constant is determined such that the relationship of input and output is approximated by a secondary function.

The fifth term is a third harmonic component. The sixth and seventh terms are each a component of a sum of and difference between one second harmonic and the other frequency. These terms resemble the fourth term. Incidentally, the fifth, sixth and seventh term have tertiary coefficients.

Generally, the frequency component "mf1±nf2" (m, n=1, 2, 3 . . . ) caused by the non-linearity of a circuit, such as amplifier, is called "intermodulation product".

The two input signal frequencies f1 and f2 have a difference (f1−f2) of 1 kHz. This means that the component in the latter part of the fourth term has a frequency of 1 kHz, e.g. is heard as noise by the FM-broadcast listener.

Incidentally, although the coefficient notation was omitted in the foregoing Equation (4), the coefficients of the second term are representative of a basic wave component (f1) includes an amplitude value A of one input signal and an amplitude value B ($AB^2$) of the other input signal B. This means that the amplitude of one signal is influenced by the amplitude of the other signal. Consequently, changing the amplitude of the other signal causes a variation in the amplitude of one signal. This phenomenon is called "cross modulation distortion", which is heard as noise by the listener, similarly to the above.

Where an FM broadcast or the like is received by using a vehicular receiver, noise during traveling cannot be heard due to masking by engine sound. However, in the case of reception while the vehicle is stopped, distortion based, for example, on the foregoing intermodulation is readily heard as noise.

As noted before, countermeasures are taken to suppress interference wave radiation by attaching, on the receiver side, a noise suppressing unit, such as a filter or a shield while, on the vehicle-mounted electronic apparatus side, by selecting a CPU for use in the electronic apparatus, using an appropriate printed-board pattern or adding countermeasure parts such as a shield, for example.

However, the effects of suppressing the interference wave radiation are not readily predictable. In many cases, the final decision of what countermeasures must be provided is impossible without providing them on each actual vehicle. For this reason, the length of time required for design or assessment is significant, correspondingly increasing the manufacture cost.

The present invention has been made in view of these problems, and it is an object thereof to provide a vehicular electronic apparatus capable of effectively suppressing the interference with broadcast wave reception resulting from intermodulation.

SUMMARY OF THE INVENTION

The present invention provides embodiments that solve the foregoing problem.

In one embodiment, a vehicular electronic apparatus comprises: a microcomputer; and a crystal oscillator for determining an operating frequency for the microcomputer; an oscillation frequency of the crystal oscillator being selected such that a frequency difference between a frequency of a broadcast wave received by a vehicular receiver and an oscillation frequency of the crystal oscillator or a higher harmonic of the oscillation frequency is 15 kHz or higher or 400 Hz or lower, to suppress an interference in receiving the broadcast wave.

In this manner, because of setting an interference wave frequency f2 such that a differential frequency (f1−f2) falls outside an audible frequency band, noise can be suppressed. In addition, the effects of setting the frequency can be predicted with high probability. This eliminates the necessity to conduct experiments using an actual vehicle, shortening the time required for design or assessment and enabling efficient development. Furthermore, the noise frequency (f1−f2) can be predicted because it is a difference between a broadcast wave frequency f1 and an interference wave frequency f2 caused from the crystal oscillator or the like, as noted before. Meanwhile, noise intensity (amplitude value) can be predicted from broadcast wave intensity and interference wave intensity. Accordingly, utilizing this fact, it is possible on a particular vehicle to trace an interference wave generation source from the frequency of the noise or to specify the frequency and intensity of the noise on the basis of an existence of a particular interference wave generation source. Due to this, it is possible to carry out noise-suppressing measures on an actual vehicle with greater efficiency.

In another embodiment, a vehicular electronic apparatus comprises: a microcomputer; and a crystal oscillator for determining an operating frequency for the microcomputer; an oscillation frequency of the crystal oscillator or a higher harmonic of the oscillation frequency is selected to fall within a band of an FM-broadcast main signal to be received by a vehicular receiver, to suppress an interference in receiving the FM broadcast wave.

In this manner, because of setting an interference wave frequency f2 within a domain of an FM-broadcast main signal to be received by the vehicular receiver, noise can be suppressed. The effects of such a method can be predicted with high probability. This eliminates the necessity to conduct experiments using an actual vehicle, shortening the time required for design or assessment and enabling efficient development. Furthermore, the noise frequency (f1−f2) can be predicted because it is a difference between a broadcast wave frequency f1 and an interference wave frequency f2 caused from the crystal oscillator or the like, as noted before. Meanwhile, noise intensity (amplitude value) can be predicted from a broadcast wave intensity and interference wave intensity. Accordingly, utilizing this fact, it is possible on a particular vehicle to trace an interference wave generation source from the frequency of the noise or to specify a frequency and intensity of the noise on the basis of an existence of a particular interference wave generation source. Due to this, it is possible to carry out noise-suppressing measures on an actual vehicle with greater efficiency.

In another embodiment, a vehicular electronic apparatus having an electronic unit comprises: a microcomputer; and a crystal oscillator for determining an operating frequency for the microcomputer; an oscillation frequency of the crystal oscillator being selected such that a frequency difference between an FM broadcast receiving frequency of a vehicular receiver and an oscillation frequency of the crystal oscillator or a higher harmonic of the oscillation frequency is 400 Hz or lower, to suppress an interference in receiving the FM broadcast wave.

In this manner, because of setting an interference wave frequency f2 such that a differential frequency (f1−f2) falls outside an audible frequency band, noise can be suppressed. The effect of such a method can be predicted with high probability. This eliminates the necessity for experiments to be conducted using an actual vehicle, shortening the time required for design or assessment and enabling efficient development.

Furthermore, the noise frequency (f1−f2) can be previously predicted because it is a difference between a broadcast wave frequency f1 and an interference wave frequency f2 caused from the crystal oscillator or the like, as noted before. Meanwhile, noise intensity (amplitude value) can be predicted from a broadcast wave intensity and interference wave intensity. Accordingly, utilizing this fact, it is possible on a particular vehicle to trace an interference wave generation source from the frequency of the noise or to specify a frequency and intensity of the noise on the basis of an existence of a particular interference wave generation source. Due to this, it is possible to carry out noise-suppressing measures on an actual vehicle with greater efficiency.

In another embodiment, a vehicular electronic apparatus having an electronic unit comprises: a microcomputer; and a crystal oscillator for determining an operating frequency for the microcomputer; a receiving frequency of a vehicular receiver and an oscillation frequency of the crystal oscillator or a higher harmonic of the oscillation frequency are selected coincident in frequency, to suppress an interference in receiving the broadcast wave.

In this manner, because of setting an interference wave frequency f2 such that a differential frequency (f1−f2) is "0", noise can be suppressed. The effect of such a method can be predicted with high probability. This eliminates the necessity for experiments to be conducted using an actual vehicle, shortening the time required for design or assessment and enabling efficient development.

DETAILED DESCRIPTION OF THE INVENTION

Figure 1:
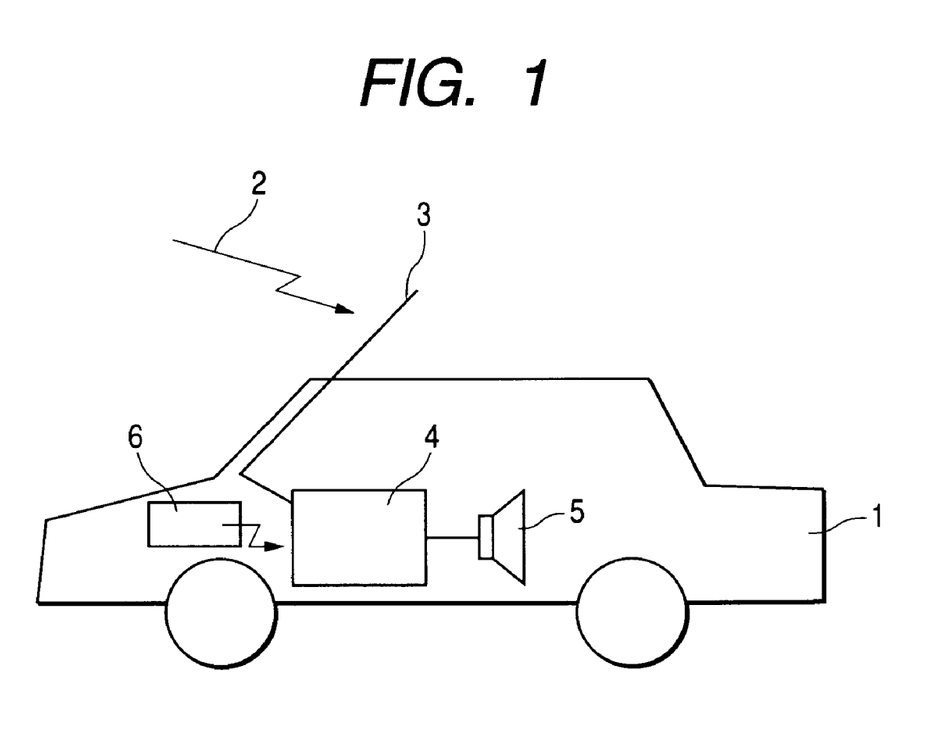
FIG. 1 is a figure explaining a vehicular electronic apparatus according to an embodiment of the present invention.

Now, an embodiment of the present invention is explained with reference to the attached drawings. FIG. 1 is a figure illustrating a vehicular electronic apparatus according to an embodiment of the invention. In the figure, 1 is a vehicle body, 2 is a broadcast wave, and 3 is an antenna attached on the vehicle body. 4 is an amplifier configuring an FM receiver and the like, wherein the amplifier 4 has non-linearity in its input-output characteristic. 5 is a speaker of the receiver, while 6 is a vehicular electronic apparatus such as a vehicle-mounted stereo player or car navigator system. The vehicular electronic apparatus 6 is configured by a microcomputer and the like. The microcomputer has a crystal oscillator 7 to generate a clock needed for the operation.

Now, the vehicular electronic apparatus mounted on the vehicle body 1 is set in an operating state. In this state, the FM receiver is powered on to start receiving a broadcast wave at a predetermined frequency f1, for example. At this time, the crystal oscillator provided by the microcomputer of the vehicular electronic apparatus 6 oscillates at a predetermined frequency, to radiate an electromagnetic wave (interference wave) at a frequency f2 as an oscillation frequency or a higher harmonic thereof.

The broadcast wave at the frequency f1 is inputted to the amplifier 4 configuring the FM receiver, through the antenna 3. Meanwhile, the interference wave at the frequency f2 generated by the vehicular electronic apparatus 6 is inputted to the amplifier 4 through the antenna 3 or directly.

Namely, two signals different in frequency (broadcast wave at a frequency f1 and interference wave at a frequency f2) are simultaneously applied to the amplifier 4. The amplifier 4 generates a new frequency of signal besides the outputs with respect to the frequencies of the two applied signals, as described before. Of the new frequencies of signals generated herein, the frequency component greatly different from the frequencies f1 and f2 can be removed by the filter or the like provided on the circuit.

Meanwhile, there arises a case that a differential frequency (f1−f2) of the newly generated signal frequencies enters an audible range, causing a case it is not to be easily removed by the filter. In such a case, the frequency f2 is favorably set to shift the differential frequency out of the audible range. In the below, setting the frequency f2 is explained. Incidentally, according to an experiment by the inventors, it has been revealed that, in the case of considering a slight noise as caused from the vehicle-mounted FM receiver or the like, the human's audible range lies, approximately, 400 Hz to 15 kHz (sound (noise) at the outside of the frequency band is extremely difficult to hear).

Figure 2:
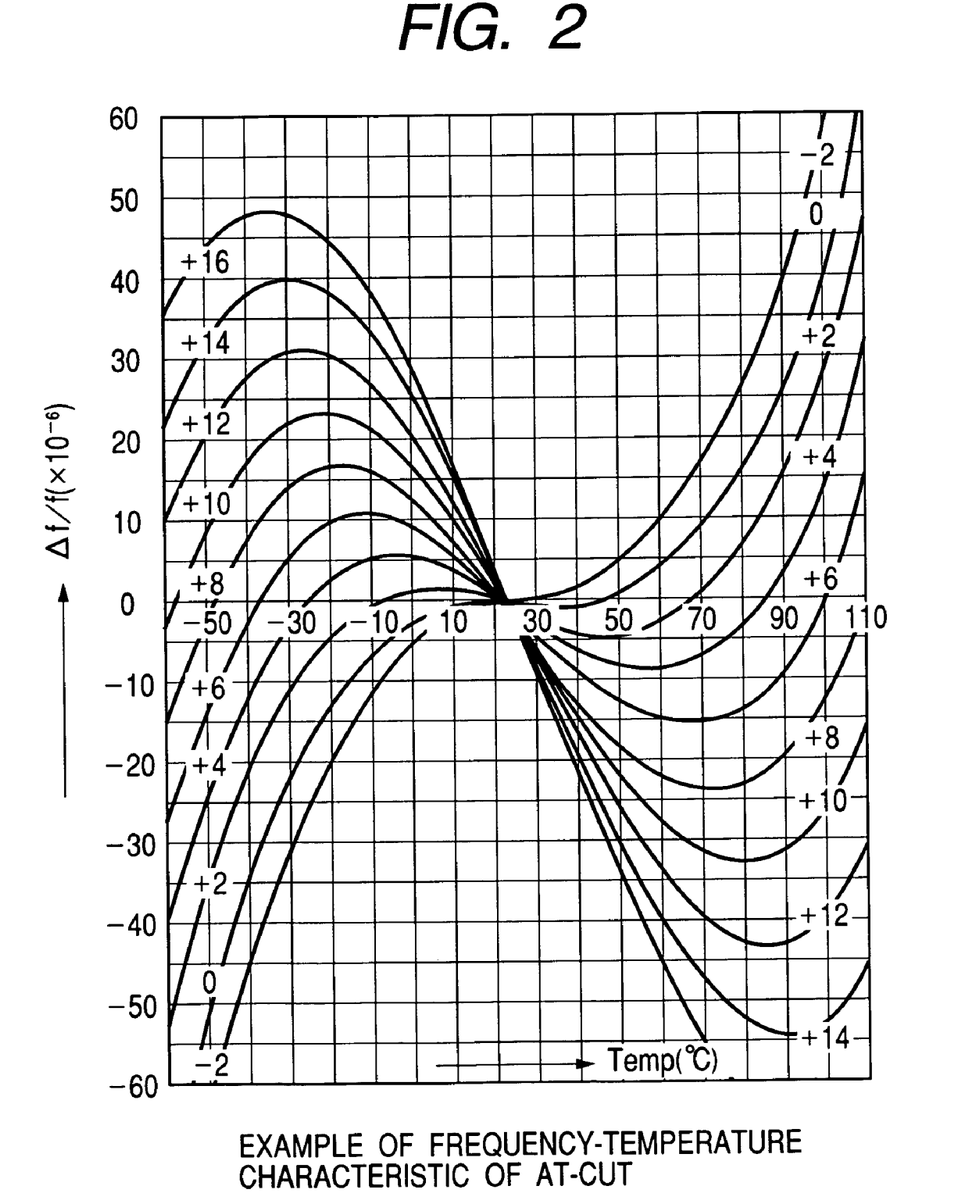
FIG. 2 is a figure showing a frequency-temperature characteristic of a crystal oscillator.

FIG. 2 is a figure showing a frequency-temperature characteristic of the usual crystal oscillator (AT-cut). The AT-cut crystal oscillator is broadly used because of less frequency change against the temperature change at around the normal temperature. As shown in the figure, the usual crystal oscillator has a frequency change of approximately 100 ppm to 5 ppm where the temperature change range thereof is −40° C. to +85° C.

Figure 3A:
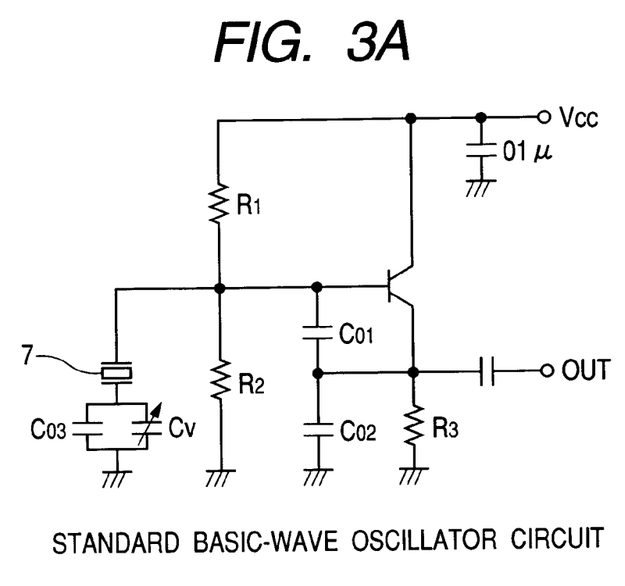
FIG. 3 is a figure explaining an oscillation circuit using a crystal oscillator.
Figure 3B:
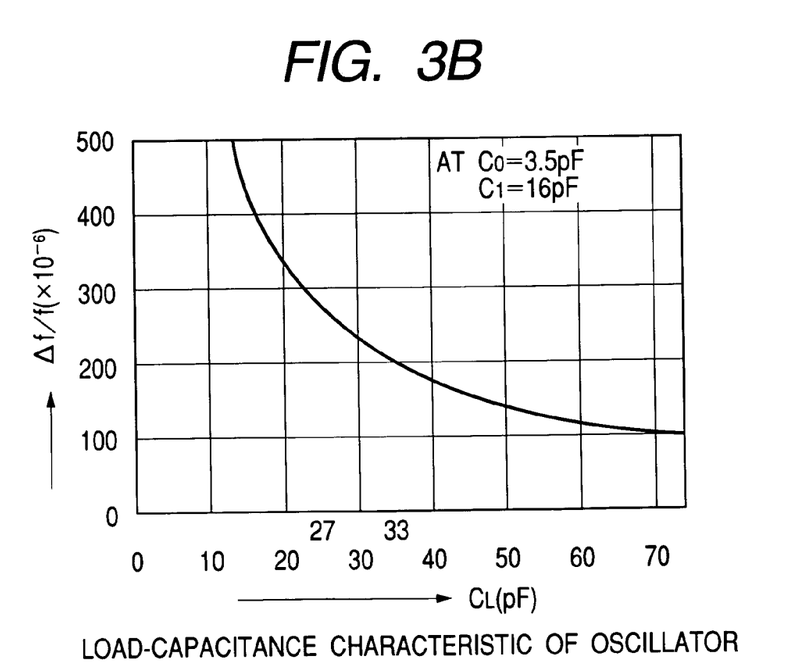

FIG. 3 is a diagram explaining an oscillator circuit using a crystal oscillator 7. FIG. 3A is a figure showing a standard basic wave oscillator circuit, and FIG. 3B is a figure showing a load-capacitance characteristic of the crystal oscillator 7 in the oscillator circuit.

As shown in FIG. 3B, adjusting the capacitance of a variable trimmer capacitor Cv makes it possible to adjust a load capacitance Cl. This can adjust oscillation frequency. For this reason, oscillation frequency can be adjusted to a predetermined value irrespectively of the manufacturing error of the crystal oscillator, variation in the element configuring the oscillator circuit and so on.

However, in the case, for example, of a crystal oscillator having an oscillation frequency of crystal oscillator (including a higher harmonic of the oscillation frequency) to cause an interference wave of 80 MHz, when the oscillation frequency varies 100 ppm due to temperature change, the frequency of interference wave varies 8 kHz. Accordingly, in this case, even if the oscillation frequency is made coincident with the broadcast wave frequency f1, the differential frequency (f1−f2) is within an audible range due to the temperature change. Namely, noise is able to be heard.

Accordingly, in order for the noise not to be heard regardless of temperature change, the oscillation frequency change due to temperature change must be equal to or less than 5 ppm. In this case, the differential frequency (f1−f2) is 400 Hz or lower, and does not fall within the audible range. Incidentally, it is easy to obtain a crystal oscillator having an oscillation frequency change whose temperature change is 5 ppm or lower.

Meanwhile, in place of the technique to set the differential frequency (f1−f2) at 400 Hz or lower, the differential frequency (f1−f2) can be set at 15 kHz or higher. In this case, the oscillation frequency is satisfactorily due to the distance from the reception frequency f1.

FIG. 4 is a figure showing a relationship between a frequency f1 of FM broadcast wave and a frequency f2 of interference wave. As shown in the figure, the FM broadcast frequency f1 comprises an FM carrier signal f0, a pilot signal fp1, a second harmonic signal fp2 of the pilot signal, a third harmonic signal fp3 of the pilot signal . . . . The differential frequency between these signals and the interference wave frequency f2 results in a noise frequency. Incidentally, the frequency difference between the usual FM-broadcast FM carrier signal f0 and the pilot signal fp1 is 19 kHz as shown in the figure, while the frequency difference between the higher harmonics (fp2, fp3) of the pilot signals is 19 kHz.

Figure 4A:
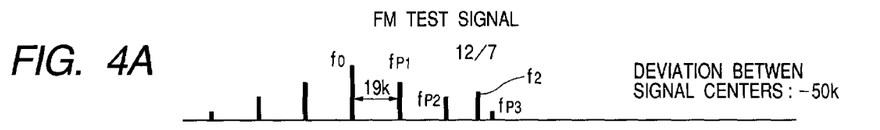
FIG. 4 is a figure showing a relationship between an FM-broadcast wave frequency and an interference wave frequency.

FIG. 4A shows an example that an interference wave is supplied such that the frequency f2 thereof has a frequency difference 50 kHz (deviation between signal centers of 50 kHz) with respect to the FM carrier signal f0. In this case, the interference wave frequency f2 and the higher harmonic fp2 of pilot signal have a frequency difference of 12 kHz, while the interference wave frequency f2 and the pilot signal fp3 have a frequency difference of 7 kHz (shown at 12/7 in the figure).

Figure 4B:
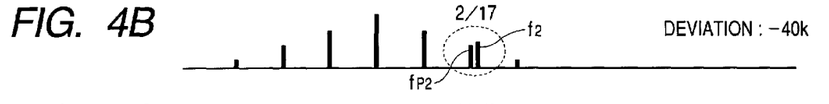
Figure 4C:
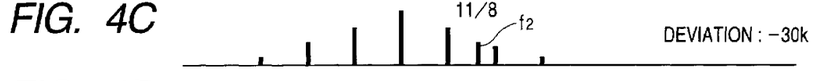
Figure 4D:
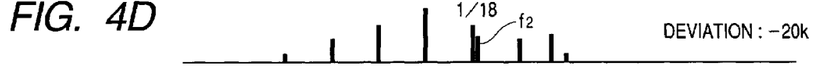
Figure 4E:
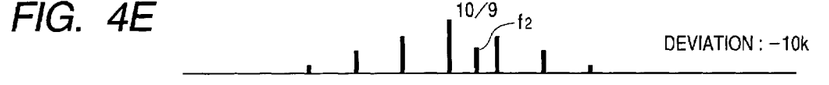

FIG. 4B shows an example that an interference wave is supplied such that the frequency f2 thereof has a frequency difference 40 kHz (deviation between signal centers of 40 kHz) with respect to the FM carrier signal f0. In this case, the interference wave frequency f2 and the higher harmonic fp2 of pilot signal have a frequency difference of 2 kHz, while the interference wave f2 and the higher harmonic fp3 of pilot signal have a frequency difference of 17 kHz (shown at 2/17 in the figure).

Similarly, FIGS. 4C, 4D, 4E and 4F illustrate examples in which the deviation between signal centers is 30 kHz, 20 kHz, 10 kHz and 0 kHz.

In this manner, a noise is generated having various frequency components based on a frequency difference between an FM broadcast wave frequency f1 and an interference wave frequency f2. Accordingly, the interference wave frequency f2 must be set such that these frequency components fall outside the audible frequency band, as shown for example in FIG. 4F. Incidentally, because the FM broadcast wave frequency f1 is known in each locality, it is easy to set the interference wave frequency f2 such that the noise frequency component falls outside the audible frequency band.

Figure 4F:
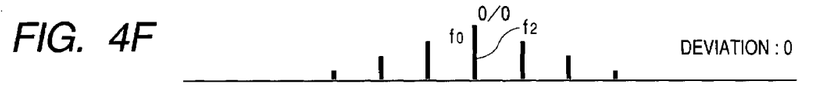

Incidentally, if the differential frequency (f1−f2) is set at "0" as shown in FIG. 4F, the noise based on the differential frequency (f1−f2) can be not heard by humans.

Incidentally, in case the interference wave is at a clock frequency for use on a microcomputer, the differential frequency (f1−f2) can be rendered "0" by placing the clock frequency synchronous with a reception frequency. In this case, by using for example an accurate crystal oscillator or by using means for frequency-dividing a pulse synchronized with a broadcast frequency generated by a PLL circuit used in a receiver tuner, it is possible to obtain a clock frequency synchronized with or nearly synchronized with the reception frequency.

Figure 5:
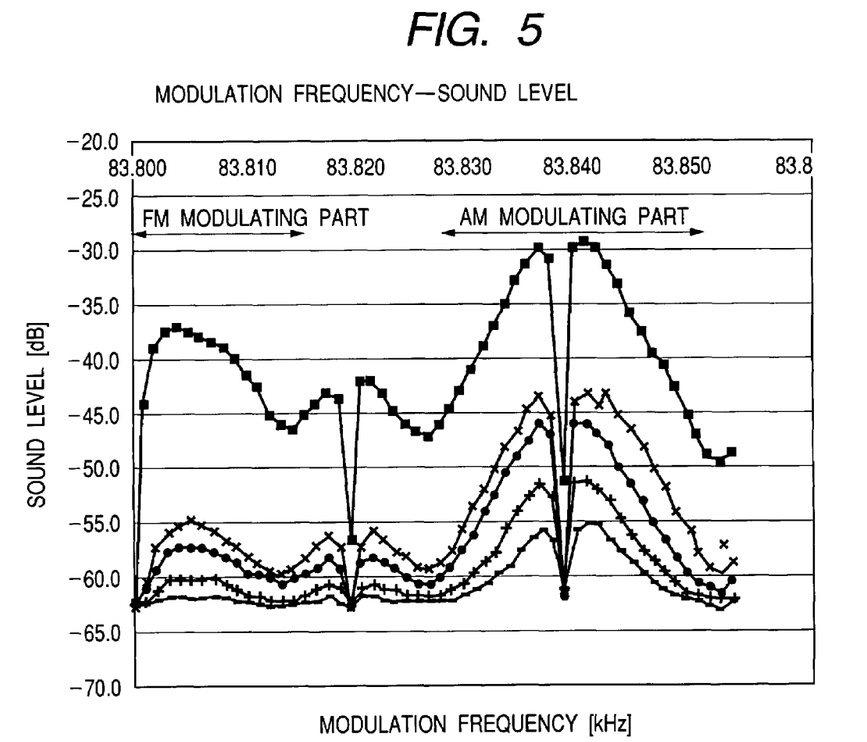
FIG. 5 is a figure showing a relationship between a modulation frequency and a sound level.

Next, FIG. 5 is a figure showing an example of a relationship between a modulation frequency (base-band frequency) and a sound level (noise level within a vehicle). This example is of a broadcast signal in a carrier wave suppressed AM-FM scheme in which a stereo sub-carrier wave is suppressed (wherein the relationship between a modulation frequency and a sound level shows a different characteristic on each vehicle). The curves in the figure are curves connecting between points having the same amplitude value of noise signal.

As shown in the figure, it is to be understood that noise level is suppressed in a low band region of an FM modulation part as an addition signal added with left and right sound signals. Also, comparing between the noise levels of the FM modulation part and AM modulation part, it can be seen that the FM modulation part is lower in noise level and more advantageous.

Figure 6A:
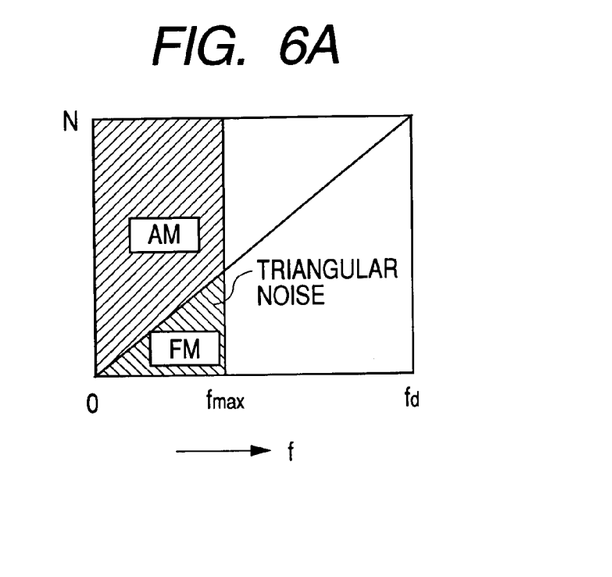
FIG. 6 is a figure explaining a noise improving ratio.
Figure 6B:
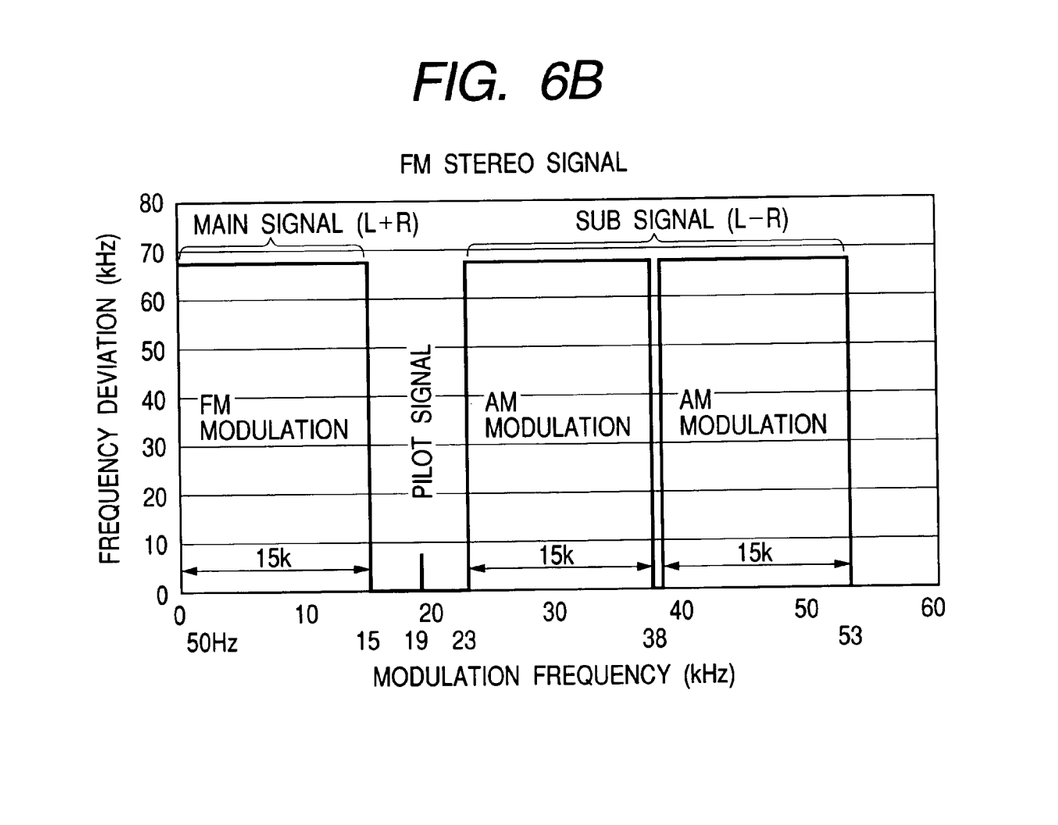

FIG. 6 is a figure explaining a noise improving ratio with respect to a continuous noise in amplitude modulation and frequency modulation. FIG. 6A is a figure showing a noise spectrum in amplitude modulation (AM) and frequency modulation (FM), while FIG. 6B is a figure showing an FM stereo signal (base-band signal).

As shown in FIG. 6A, the noise spectrum in amplitude modulation is constant at any of modulation signal frequencies. Meanwhile, the noise spectrum in frequency modulation has a characteristic that noise intensity increases in proportion to modulation signal frequency, because of a modulator characteristic (triangular noise spectrum).

Because the components of the continuous noise are not the same in phase, provided that the noise voltage at each frequency is e, the noise amount per frequency in the case of amplitude modulation is N and the maximum frequency of a transmission signal is $f_{max}$, the noise amount may be determined by integrating $e^2$ from frequency 0 to $f_{max}$ and determining a square root thereof. The noise amount $N_{AM}$ in the case of amplitude modulation is given by $$N_{AM} = N(f_{max})^{1/2}.$$

Meanwhile, provided that the frequency transition in frequency modulation is $f_d$, the noise amount $N_{FM}$ in frequency modulation is given by $$N_{FM} = N(f_{max})^{3/2}/\sqrt{3}f_d.$$

Accordingly, the noise improving ratio $N_{FM}/N_{AM}$ in continuous noise, provided that deviation ratio m is $f_d/f_{max}$, is given by $$N_{FM}/N_{AM} = 1/\sqrt{3}m.$$

Herein, in case the deviation ratio m is assumed 5, then $N_{FM}/N_{AM} = 1/\sqrt{3} \times 5 = 1/8.66$ results.

In case this is applied to the broadcast signal in the carrier wave suppressed AM-FM scheme shown in FIG. 6B, shown is a fact that the main signal (L+R) in frequency modulation is improved in S/N ratio by 8.66 times relative to the sub signal (L−R) in amplitude modulation.

If the above is summarized, it can be seen that the interference wave frequency f2 as a noise frequency against the FM receiver desirably falls within a domain of an FM broadcast main signal.

In the above explanation, it was explained that noise can be suppressed by (1) setting an interference wave frequency f2 such that the differential frequency (f1−f2) falls outside an audible frequency band, (2) setting an interference wave frequency f2 such that the differential frequency (f1−f2) is at "0", (3) setting an interference wave frequency f2 within a domain of an FM broadcast main signal the vehicle-mounted receiver is to receive.

With the method of setting an interference wave frequency as in the above, the effects can be predicted with high probability. This eliminates the necessity to conduct experiments using an actual vehicle, shortening the time required for design or assessment and enabling efficient development.

In addition, the noise frequency (f1−f2) can be predicted because it is a difference between a broadcast wave frequency f1 and an interference wave frequency f2 caused from the crystal oscillator or the like, as noted before. Meanwhile, noise intensity (amplitude value) can be predicted from a broadcast wave intensity and interference wave intensity.

Accordingly, utilizing this fact, it is possible on a particular vehicle to trace an interference wave generation source from the frequency of the noise or to specify a frequency and intensity of noise on the basis of an existence of a particular interference wave generation source. Due to this, it is possible to carry out noise-suppressing measures on an actual vehicle with greater efficiency.

As explained above, according to the present invention, a vehicular electronic apparatus can be provided which can suppress interference against broadcast wave reception as caused by mutual modulation.

What is claimed is:

1. A vehicular electronic apparatus having an electronic unit comprising:

a microcomputer; and a crystal oscillator for determining an operating frequency for the microcomputer;

an oscillation frequency of the crystal oscillator being selected such that a frequency difference between an FM broadcast receiving frequency of a vehicular receiver and the oscillation frequency of the crystal oscillator or a higher harmonic of the oscillation frequency is at most 400 Hz, to suppress an interference in receiving the FM broadcast wave.

2. A vehicular electronic apparatus having an electronic unit comprising:

a microcomputer;

a crystal oscillator for determining an operating frequency for the microcomputer; and a receiving frequency of a vehicular receiver and an oscillation frequency of the crystal oscillator or a higher harmonic of the oscillation frequency are coincident in frequency, to suppress an interference in receiving the broadcast wave.

3. The vehicular electronic apparatus of claim 1, wherein a value at which the oscillation frequency or the harmonics thereof, caused by changes in temperature of the crystal oscillator, change does not fall within an audible frequency range.

4. The vehicular electronic apparatus of claim 3, wherein the receiving frequency of the vehicular receiver and the oscillation frequency of the crystal oscillator or the higher harmonic of the oscillation frequency are adjusted to match each other in accordance with the receiving frequency.

* * * * *